United States Patent [19]

East

[11] 4,393,191

[45] Jul. 12, 1983

[54] PREPARATION OF AROMATIC POLYESTERS BY DIRECT SELF-CONDENSATION OF AROMATIC HYDROXY ACIDS

[75] Inventor: Anthony J. East, Madison, N.J.

[73] Assignee: Celanese Corporation, New York, N.Y.

[21] Appl. No.: 355,992

[22] Filed: Mar. 8, 1982

[51] Int. Cl.$^3$ .............................................. C08G 63/10
[52] U.S. Cl. .................................... 528/207; 528/180; 528/181; 528/190; 528/206
[58] Field of Search ................................. 528/179–181, 528/190, 206–207

[56] References Cited

U.S. PATENT DOCUMENTS

| | | | |
|---|---|---|---|
| 4,161,470 | 7/1979 | Calundann | 528/206 |
| 4,256,624 | 3/1981 | Calundann | 528/190 |
| 4,318,841 | 3/1982 | East et al. | 528/190 |
| 4,318,842 | 3/1982 | East et al. | 528/190 |
| 4,337,190 | 6/1982 | Calundann | 528/190 |

*Primary Examiner*—Lester L. Lee
*Attorney, Agent, or Firm*—Burns, Doane, Swecker & Mathis

[57] ABSTRACT

Provided is a method for preparing melt-processable polyesters efficiently via the direct polymerization of aromatic hydroxy acids. By the direct polymerization method, hydroxy and acid moieties are reacted directly without the use of acetylated reactants, thereby avoiding the disadvantages inherent in the case of acetylated reactants. The direct polymerization is conducted in the presence of a catalyst comprising a metal selected from the group consisting of the Group IV and V metals.

11 Claims, No Drawings

PREPARATION OF AROMATIC POLYESTERS BY DIRECT SELF-CONDENSATION OF AROMATIC HYDROXY ACIDS

BACKGROUND OF THE INVENTION

1. Field of the Invention

The present invention relates to a process for preparing melt-processable aromatic polyesters via the direct condensation of aromatic hydroxy acids. More specifically, the present invention relates to a process of direct polymerization of aromatic hydroxy acids which is conducted in the presence of a Group IV or V metallic catalyst.

2. Description of the Prior Art

Wholly aromatic polyester resins, with the aromatic polyester being considered to be "wholly" aromatic in the sense that each moiety present contributes at least one aromatic ring to the polymer backbone, have long been known. For instance, 4-hydroxybenzoic acid homopolymer and copolymers have been provided in the past and are commercially available. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequently exhibit an isotropic melt phase. Molding techniques such as compression molding or sintering may be utilized with such materials; however, injection molding, melt spinning, etc., commonly have not been viable alternatives or when attempted commonly have been accomplished with difficulty.

Representative publications which discuss wholly aromatic polyesters include: (a) "Polyesters of Hydroxybenzoic Acids," by Russell Gilkey and John R. Caldewell, *J. of Applied Polymer Sci.*, Vol. II, Pages 198 to 202 (1959), (b) "Polyarylates (Polyesters From Aromatic Dicarboxylic Acids and Bisphenols)," by G. Bier, *Polymer*, Vol. 15, Pages 527 to 535 (August 1974), (c) "Aromatic Polyester Plastics," by S. G. Cottis, *Modern Plastics*, Pages 62 to 63 (July 1975); and (d) "Poly(p-Oxygenzoyl Systems): Homopolymer for Coatings: Copolymers for Compression and Injection Molding," by Roger S. Storm and Steven G. Cottis, *Coatings Plast. Preprint*, Vol. 34, No. 1, Pages 194 to 197 (April 1974). See also, U.S. Pat. Nos. 3,039,994; 3,169,121; 3,321,437; 3,553,167; 3,637,595; 3,651,014; 3,723,338; 3,759,870; 3,767,621; 3,778,410; 3,787,370; 3,790,528; 3,829,406; 3,890,256; and 3,975,487.

Also, it has been disclosed that certain polyesters may be formed which exhibit melt anisotropy. See for instance, (a) "Polyester X7G-A Self Reinforced Thermoplastic," by W. J. Jackson Jr., H. F. Kuhfuss, and T. F. Gray, Jr. 30th Anniversary Technical Conference, 1975 Reinforced Plastic/Composites Institute. *The Society of the Plastics Industry, Inc.*, Section 17-D, Pages 1 to 4, (b) Belgian Pat. Nos. 828,935 and 828,936, (c) Dutch Pat. No. 7505551, (d) West German Nos. 2520819, 2520820, 2722120, 2834535, 2834536 and 2834537, (e) Japanese Nos. 43-223; 2132-116; and 3021-293, (f) U.S. Pat. Nos. 3,991,013; 3,991,014; 4,057,597; 4,066,620; 4,067,852; 4,075,262; 4,083,829; 4,118,372; 4,130,545; 4,130,702; 4,156,070; 4,159,365; 4,169,933; 4,181,792; 4,183,895; 4,188,476; 4,189,996; 4,201,856; 4,224,433; 4,226,970; 4,230,817; 4,232,143; 4,232,144; 4,238,598; 4,238,600; 4,239,599; 4,242,496; 4,245,082; 4,245,084; 4,247,514; 4,256,802; 4,269,965; 4,287,332 and 4,294,955; and (g) U.K. application No. 2,002,404.

Additionally in commonly assigned U.S. Pat. No. 4,161,470 is claimed a polyester of 6-hydroxy-2-naphthoic acid and para-hydroxy benzoic acid, and in commonly assigned U.S. Pat. No. 4,219,461, is claimed a polyester of 6-hydroxy-2-naphthoic acid, para-hydroxybenzoic acid, aromatic diol, and aromatic acid. Moreover, in commonly assigned U.S. Pat. No. 4,256,624 is claimed a polyester of 6-hydroxy-2-naphthoic acid, an aromatic diol and an aromatic diacid. Each of these polyesters exhibits an anisotropic melt phase and is capable of readily undergoing melt processing to form quality fibers, molded articles, etc.

An established procedure for preparing aromatic polyesters of fiber-forming molecular weight is by thermally reacting acetates with carboxylic acids. In other words, the aromatic hydroxy groups are acetylated. The use of acetylated reactants has been of utmost importance when preparing a polyester of an aromatic hydroxy acid since certain aromatic hydroxy acid compounds tend to decarboxylate upon direct esterification. For example, para-hydroxybenzoic acid is notorious for severe decarboxylation upon attempted direct esterification. Decarboxylation adversely effects the yield of the process, the nature and composition of the final product, and the economic viability of the process.

A reaction involving acetylated reactants, however, liberates acetic acid which is corrosive and thus requires the use of special corrosion resistant equipment. A further disadvantage is that the esterified or acetylated reactants are more costly than the unesterified reactants. Accordingly, a polyesterification involving an aromatic hydroxy acid wherein all hydroxy and acid moieties are efficiently and effectively reacted directly would be of advantage since the high cost of using esterified products would be avoided and by-product water presents far less of a disposal problem than the acetic acid involved with ester reactants.

The polycondensation of a phenolic moiety with an aromatic carboxylic acid moiety, in general, has been found to be impracticable or simply not to work. However, some limited success has been achieved.

For example, U.S. Pat. No. 4,093,595 discloses a catalytic procedure for the preparation of polyesters from (1) dihydric phenols and (2) aromatic dicarboxylic acids by direct polymerization in the presence of an antimony, tin or titanium catalyst. The patent does not, however, address the problem of aromatic hydroxy acid decarboxylation upon direct esterification, nor suggest any method for the direct formation of polyesters such as those disclosed in the aforenoted U.S. Pat. No. 4,161,470. Dihydric phenols and aromatic dicarboxylic acids are the only reactants used.

William W. Lowrance, Jr., in *Tetrahedron Letters*, No. 37, pp. 3453-3454 (1971), discloses that phenol esters such as phenyl benzoates can be prepared by direct esterification upon refluxing a solution containing phenol, benzoic acid and catalytic amounts of boric and sulfuric acids. The article does not pertain to the preparation of polyesters or to the direct reaction of aromatic hydroxy acids.

Higashi et al. in *Journal of Polymer Science: Polymer Letters Edition*, Vol. 18, 385-388 (1980), disclose that aromatic polyesters can be prepared directly from aromatic hydroxy acids such as p- and m-hydroxybenzoic acids, as well as a combination of dicarboxylic acids and bisphenols, by conducting the polycondensation in the presence of hexachlorocyclotriphosphatriazene in pyridine. The use of such a promoter, however, has many disadvantages, e.g., cost.

Thus, an easy and economically attractive process for preparing melt-processable, aromatic hydroxy acid comprising polyesters via the direct polycondensation thereof is heretofore unknown to the prior art and is a desideratum thereof.

Accordingly, it is an object of the present invention to provide a novel and more economically attractive process for preparing wholly aromatic polyesters of aromatic hydroxy acids.

It is another object of the present invention to provide a process for preparing aromatic polyesters which minimizes the expected decarboxylation of aromatic hydroxy acids and the adverse effects thereof.

Another object of the present invention is to provide a direct polycondensation process for preparing the polyesters claimed in U.S. Pat. No. 4,161,470.

Still another object of the present invention is to provide an efficient process for the direct polymerization of 6-hydroxy-2-naphthoic acid and p-hydroxybenzoic acid or other aromatic hydroxy acids.

These and other objects, as well as the scope, nature and utilization of the invention, will be apparent to those skilled in the art from the following description and the appended claims.

SUMMARY OF THE INVENTION

It has now surprisingly and unexpectedly been found that wholly aromatic polyesters of aromatic hydroxy acids can be effectively prepared by direct polycondensation. The process comprises reacting the aromatic hydroxy acids, i.e., a hydroxynaphthoic acid and a hydroxybenzoic acid, in the presence of a catalytic amount of a metal catalyst under reaction conditions sufficient for polymerization and formation of the wholly aromatic polyester, with the temperature preferably being sufficient to maintain at least one reactant and the resultant polyester in a melt phase. The metal catalyst employed in the reaction comprises a compound of a metal selected from the group consisting of the metals of Groups IV and V of the Periodic Table.

In a preferred embodiment, 6-hydroxy-2-naphthoic acid is directly polycondensed with p-hydroxybenzoic acid.

DESCRIPTION OF THE PREFERRED EMBODIMENTS

The process of the instant invention provides one with a process which effectively, efficiently and directly allows one to prepare a polyester of aromatic hydroxy acids. The reactants comprise at least two different aromatic hydroxy acids, i.e., at least one hydroxynaphthoic acid and at least one hydroxybenzoic acid.

The direct polycondensation of the reactants is accomplished in the presence of a catalytic amount of a metal catalyst, wherein the metal is selected from the group consisting of the metals of Groups IV and V of the Periodic Table. Preferably, the catalyst is a salt, oxide or organometallic derivative of either antimony, titanium, tin or germanium, with tin compounds being the most preferred for reasons of catalyst activity.

Representative examples of suitable catalysts, without being limited thereto, include the dialkyl tin oxides such as dibutyl and dimethyl tin oxide, diaryl tin oxides such as diphenyl tin oxide, dialkyl tin esters such as dibutyl tin diacetate, stannous sulfate, stannous oxalate, n-butyl stannoic acid, dimethoxy tin, titanium dioxide, titanium alkoxides, tetrabutyl titanate, tetraisopropyl titanate, tetraphenyl titanate, dicyclopentadienyldiphenyl titanium, antimony trioxide and germanium dioxide. Dialkyl tin diacetate is the most preferred catalyst.

The amount of catalyst employed is a catalytically effective amount, which is an amount sufficient to increase the rate of polymerization, which can be measured by conventional means such as the inherent viscosity of the resulting polyester. The quantity of catalyst utilized is typically in the range of from about 0.001 to about 5 weight percent based upon the total monomer reactant weight, with from 0.01 to about 1.0 weight percent being preferred, and from 0.05 to about 0.5 weight percent being most preferred.

The hydroxynaphthoic acid reactant of the instant invention may have some additional substitution on the aromatic rings beside the hydroxy and carboxyl moieties. Such optional substitution may be with substituents inert in the polymerization reaction, e.g., alkyl, alkoxy, aryl, halo and mixtures thereof. When the substituent is an alkyl or alkoxy, it preferably contains from 1 to about 4 carbons. When the substituent is an aryl, it preferably contains from 6 to 10 carbons (e.g., phenyl). When the substituent is a halogen, it may be fluorine, chlorine, bromine or iodine. The presence of such ring substituents can tend to modify to some extent the physical properties of the resulting polyester polymer, e.g., the polymer may soften at a lower temperature, its impact strength may be improved, and the crystallinity of the solid polymer formed may be decreased. The specific properties desired in the polyester product will influence the choice of substituents on the hydroxy naphthoic acid reactant. In a preferred embodiment, 6-hydroxy-2-naphthoic acid without any further ring substitution is employed in order to provide a polyester of optimum crystallinity in the solid state.

Representative examples of substituted hydroxy naphthoic acid reactants include: 6-hydroxy-5-chloro-2-nahthoic acid, 6-hydroxy-5-methyl-2-naphthoic acid, 7-hydroxy-5-methoxy-2-naphthoic acid, 6-hydroxy-7-chloro-2-naphthoic acid, 6-hydroxy-4,7-dichloro-2-naphthoic acid, etc., and mixtures thereof.

The amount of hydroxynaphthoic acid employed can vary greatly, but is generally within the range of from about 10 to 90 mole percent of the total monomer reactants, more preferably in the range from about 15 to 35 mole percent, and most preferably in the range from about 20 to 30 mole percent, e.g., approximately 25 mole percent.

If desired, a mixture of hydroxynaphthoic acids may be employed.

The hydroxybenzoic acid reactant of the instant invention may also contain some additional substitution on the aromatic ring beside the hydroxy and carboxyl moieties. Such optional substitution may be with substituents inert in the polymerization reaction, e.g., alkyl, alkoxy, aryl, halo and mixtures thereof. When the substituent is an alkyl or alkoxy, it preferably contains from 1 to about 4 carbons. When the substituent is an aryl, it preferably contains from 6 to about 10 carbons (e.g. phenyl). If the substituent is a halogen, it is preferably selected from the group consisting of chlorine, bromine and iodine. The presence of such ring substituents can tend to modify to some extent the physical properties of the resulting polyester polymer, as discussed with regard to the hydroxynaphthoic acid reactant. In a preferred embodiment, unsubstituted p-hydroxybenzoic acid is employed in order to provide a resulting polyester of optimum crystallinity in the solid state.

Representative examples of other suitable hydroxy benzoic acid reactants include 3-chloro-4-hydroxy benzoic acid, 2-chloro-4-hydroxy benzoic acid, 2,3-dichloro-4-hydroxybenzoic acid, 3,5-dichloro-4-hydroxybenzoic acid, 2,5-dichloro-4-hydroxy benzoic acid, 3-bromo-4-hydroxy benzoic acid, 3-methyl-4-hydroxybenzoic acid, 3,5-dimethyl-4-hydroxybenzoic acid, 2,6-dimethyl-4-hydroxybenzoic acid, 3-methoxy-4-hyroxybenzoic acid, 3,5-dimethoxy-4-hydroxy benzoic acid, etc.

The amount of hydroxybenzoic acid employed can vary greatly, but is generally within the range of from about 10 to 90 mole percent of the total monomer reactants, more preferably in the range from about 65 to 85 mole percent, and most preferably in the range from about 70 to 80 mole percent, e.g., approximately 75 mole percent.

If desired, a mixture of hydroxy benzoic acids may be employed, for example, a mixture of a p-hydroxybenzoic acid and m-hydroxybenzoic acid.

In general, it is preferred to conduct the reaction of the instant invention under conventional conditions for melt polymerization, with the aromatic hydroxy acids being reacted in the presence of a catalytic amount of a suitable metal catalyst as described before. The time, temperature and pressure conditions to be employed for optimum results depends on the specific reactants used and on the specifically selected catalyst. It is important, however, that the reactants and the resulting polymer suffer no substantial degradation under the polymerization conditions.

The temperature must be at least high enough so that melt polymerization may be carried out, i.e., so that at least one of the reactants and the aromatic polyester polymer product is in a melt phase. Temperatures in the range of from about 250° C. to about 360° C. can generally be employed, with a temperature in the range from about 270° C. to about 340° C. being preferred, and a temperature in the range from about 280° C. to about 320° C. being most preferred. However, the temperature should ordinarily not be so great as to cause degradation of the polymer as may be observed from undue darkening of the polymer.

If desired, a vacuum can be applied at a suitable place in the polymerization to rapidly remove water and to hasten the polymerization after sufficient reaction has taken place so that the loss of reactants through sublimation or other means is minimized. Other than during the vacuum cycle, the reaction is conducted generally at atmospheric pressure, although this may vary if desired. Also, to minimize oxidation, the reaction is preferably carried out in an inert atmosphere such as nitrogen or argon.

Other polymerization techniques, however, e.g., a slurry polymerization, such as that described in commonly assigned U.S. Pat. No. 4,067,852 of Gordon W. Calundann, entitled "Melt Processable Thermotropic Wholly Aromatic Polyester Containing Polyoxybenzoyl Moiety" where the solid product is suspended in a heat exchange medium, may also be employed. The disclosure of the Calundann patent is herein expressly incorporated by reference.

The reaction is generally conducted until the desired molecular weight (for example, for fiber forming) has been reached. Preferably, the wholly aromatic polyesters of the present invention would have a weight average molecular weight in the range from about 2,000 to abut 200,000, more preferably from about 10,000 to about 50,000, and most preferably from about 20,000 to about 25,000. The molecular weight may be determined by standard techniques not involving the solutioning of the polymer, e.g., by end group determination via infra red spectroscopy on compression molded films. Alternatively, light-scattering techniques in a pentafluorophenol solution can be employed to determine the molecular weight.

The inherent viscosity (i.e., I.V.) of the polyester can also be measured, and is preferably at least 2.5, and more preferably at least about 3.5, e.g., from 3.5 to 7.5, when dissolved in pentafluorophenol at a concentration of 0.1 percent by weight at 60° C.

The polyester formed by the process of the present invention is easily melt processable.

Unlike the aromatic polyesters commonly encountered in much of the prior art, the wholly aromatic polyester formed is not intractable and forms an anisotropic melt phase whereby an atypical degree of order is manifest in the molten polymer. The resultant polyester readily forms liquid crystals in the melt phase and accordingly exhibits a high tendency for the polymer chains to orient in the shear direction. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polarizers. The amount of light transmitted increases when the sample is sheared (i.e., is made to flow), however, the sample is optically anisotropic even in the static state.

The present invention provides one with a more economically attractive and direct, yet efficient, method for preparing such wholly aromatic melt processable polyesters than has previously been known. The use of acetylated reactants and the disadvantages thereof are avoided by the process of the instant invention. The present invention, therefore, allows one to prepare said valuable polyesters of aromatic hydroxy acids (i.e., a hydroxynaphthoic acid and a hydroxybenzoic acid) much more cheaply and easily so that their advantages may be more readily exploited.

The following examples are given as specific illustrations of the claimed invention. It should be understood, however, that the specific details set forth in the examples are merely illustrative and in nowise limitative. All parts and percentages in the examples and the remainder of the specification are by weight unless otherwise specified.

EXAMPLE 1

This example illustrates the preparation of a wholly aromatic copolyester from 4-hydroxybenzoic acid and 6-hydroxy-2-naphthoic acid.

A 300 ml 3-neck flask was fitted with a sealed glass paddle stirrer, a gas inlet and distillation head plus condenser and a graduated receiver. The flask was charged with 27.6 gm of 4-hydroxybenzoic acid (0.2 mole) and 56.4 gm of 6-hydroxy-2-naphthoic acid (0.3 mole). Catalyst (as indicated in Table I below) was added in various amounts based on the total charge. The flask was sparged with argon, then heated at 300° C. for one hour in an oil bath under a slow stream of argon.

Initially, the melt was clear and straw-colored, but water rapidly distilled out and the melt went first cloudy, then opaque. The water steadily distilled over, and the temperature was raised to 320° C. for 90 minutes by which time the melt was quite viscous. Vacuum (0.5 mm) was then applied for one hour. A total of 13 to 14 mls (72–77% of theory) of water generally collected in the receiver, accompanied by a small amount of phenol. The polymer color was pale cream through yellow, depending on the particular catalyst used. Strong stiff fibers with a characteristic "woody" fracture could be drawn from the melt.

The polymer was broken from the flask, ground in a Wiley Mill and extracted with acetone for two hours in a Soxhlet apparatus to remove low molecular weight materials. The physical properties are set out in Table 1.

The polymer was then micro-melt spun through a single 0.007" hole spinneret, with fiber properties then being measured. The spinning conditions and fiber properties are set out in Table 2.

TABLE 1

| Run | Catalyst | Level | $T_m$[1] | IV | Ratio[2] | Color |
|---|---|---|---|---|---|---|
| 1 | Ti(OBu)$_4$ | 200 ppm | 295 | 5.3 | 36/64 | Yellow |
| 2 | n-BuSnO.OH[3] | 200 ppm | 342 | Insol[4] | 30/70 | Cream |
| 3 | n-BuSnO.OH[3] | 1800 ppm | 295 | 5.6 | 34/66 | Cream |
| 4 | n-BuSnO.OH[3] | 5200 ppm | 310 | 3.2 | 31/69 | Cream |

[1]$T_m$ by DSC endotherm peak.
IV as 0.1% soln (w/v) in pentafluorophenol at 60° C.
[2]Ratio of hydroxybenzoic acid/hydroxynaphthoic acid monomers actually present in final polymer, which was determined by calibrated Fourier Transform Infra-Red Spectroscopy on powdered polymer using the relative intensities of bands at 1510 cm$^{-1}$ (HBA unit) and 1470 cm$^{-1}$ (HNA unit). This method is accurate to ± 5%.
[3]n-butyl stannoic acid
[4]Polymer was of extremely high molecular weight

TABLE 2

| Run | Spinning Conditions Temp/Throughput/Windup Speed | AS-Spun T/E/M[1] |
|---|---|---|
| 1 | 315° C./0.42 gm/min/421 m/min | 6.1 g/d/1.5%/470 g/d |
| 2 | 360° C./0.42 g/min/519 m/min | 9.0 g/d/2.5%/505 g/d |
| 3 | 299° C./0.42 g/min/355 m/min | 5.7 g/d/1.7%/440 g/d |
| 4 | 346° C./0.42 g/min/341 m/min | 7.2 g/d/2.1%/450 g/d |

[1]T = Tenacity (grams per denier)
E = Elongation (percent)
M = Tensile Modulus (grams per denier)

EXAMPLE 2

A wholly aromatic copolyester was prepared in accordance with the procedure of Example 1 by reacting 34.5 gm (0.25 mole) 4-hydroxybenzoic acid and 47 gm (0.25 mole) 6-hydroxy 2-naphthoic acid. Dibutyl tin diacetate (1800 ppm on total charge) was used as a catalyst. The polymerization was heated via an oil bath at 260° C. for 30 min., 280° C. for 30 min., 290° C. for 30 min., 300° C. for 30 min., and 320° C. for 30 min. A vacuum (0.5 mm) was then applied for 20 mins. at 320° C.

The melt was opaque, creamy and very viscous. Strong fibers could be drawn from the melt. A total of 15 ml water (83% theory) distilled out. The polymer was isolated as previously described in Example 1. The polymer had a Tm of 290° determined by DSC and an IV of 4.6. The ratio of hydroxybenzoic acid to hydroxynaphthoic acid units was determined to be roughly 40:60 by FTIR.

The polymer was then melt-spun at 345° C. at 0.42 g/min. through a 0.007" hole and wound up at 75 m/min. The as-spun properties were determined to be:

| tenacity: | 8.6 g/d |
|---|---|
| elongation: | 2.2 percent |
| modulus: | 593 g/d |

After a heat-treatment in a relaxed state at 300° C. for 4 hours, the properties were:

| tenacity: | 15.3 g/d |
|---|---|
| elongation: | 3 percent |
| modulus: | 510 g/d |

EXAMPLE 3

A wholly aromatic copolymer of hydroxybenzoic acid and hydroxynaphthoic acid was prepared by reacting 48.3 g (0.35 mole) of 4-hydroxybenzoic acid with 28.2 g (0.15 mole) of 6-hydroxy 2-naphthoic acid. Dibutyl tin diacetate was used as the catalyst (1800 ppm on total charge). The reaction mixture was heated for 1½ hrs. at 300° C. and at 320° C. for 30 minutes, by which time it was very viscous. Strong fibers were pulled from the melt. The total yield of water was 17 ml, (94% theory). The isolated polymer had a Tm of 240°, an IV of 6.7 and the FTIR analysis showed a hydroxybenzoic acid/hydroxynaphthoic acid ratio of approximately 65/35.

COMPARATIVE EXAMPLE

A copolymer of hydroxybenzoic acid and hydroxynaphthoic acid was prepared in accordance with the procedure of Example 1, but in the absence of a catalyst. The reaction was heated from 260° C. to 310° C. in increments of 10° over 3 hours, and was concluded at 320° C. under vacuum for 15 minutes. A total of 14 ml of distillate was collected, but this contained much phenol. The polymer was very dark in color. No fibers could be drawn. The resulting polymer had an IV of 1.86, and the FTIR showed that the hydroxybenzoic acid to hydroxynaphthoic acid ratio was only 20/80. In other words, a very large proportion of the hydroxybenzoic acid had been lost by means of decarboxylation into phenol and carbon dioxide in the absence of a catalyst as employed in accordance with the instant invention.

Although the invention has been described with preferred embodiments, it is to be understood that variations and modifications may be resorted to as will be apparent to those skilled in the art. Such variations and modifications are to be considered within the purview and the scope of the claimed appended hereto.

What is claimed:

1. A process for preparing a wholly aromatic polyester comprising reacting at least one hydroxynaphthoic acid employed in an amount ranging from about 10 to 90 mole percent and at least one hydroxybenzoic acid in an amount from about 10 to 90 mole percent in the presence of a catalytic amount of a metallic compound selected from the group consisting of a Group IV or V metal salt, oxide and organometallic derivative under polymerization reaction conditions.

2. The process defined in claim 1 wherein the reaction temperature is sufficient to maintain at least one of the reactants and the resulting polyester in a melt phase.

3. The process defined in claim 1 or 2 wherein the catalyst is dialkyl tin diacetate.

4. The process defined in claim 1 or 2 wherein 6-hydroxy-2-naphthoic acid is reacted with at least one hydroxybenzoic acid.

5. The process defined in claim 1 or 2 wherein p-hydroxybenzoic acid is reacted with at least one hydroxynaphthoic acid.

6. The process defined in claim 1 or 2 wherein 6-hydroxy-2-naphthoic acid is reacted with p-hydroxybenzoic acid.

7. The process defined in claim 1 wherein the amount of catalyst employed is in the range of from about 0.001 to about 1 weight percent based upon the total monomer reactant weight.

8. The process defined in claim 7 wherein the amount of catalyst employed is in the range from about 0.05 to about 0.5 weight percent.

9. The process as defined in claim 2 wherein the reaction temperature is in the range from about 280° C. to about 360° C.

10. The process as defined in claim 9 wherein the reaction temperature is in the range from about 270° C. to about 320° C.

11. The process defined in claim 2 comprising reacting a composition consisting essentially of 6-hydroxy-2-naphthoic acid and p-hydroxybenzoic acid at a temperature in the range from about 280° C. to about 360° C.

* * * * *